United States Patent
Minari

(10) Patent No.: US 9,171,564 B2
(45) Date of Patent: Oct. 27, 2015

(54) OPTICAL DISC DEVICE AND OPTICAL DISC REPRODUCTION METHOD

(71) Applicant: Funai Electric Co., Ltd., Daito, Osaka (JP)

(72) Inventor: Hirotaka Minari, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 19 days.

(21) Appl. No.: 14/050,461

(22) Filed: Oct. 10, 2013

(65) Prior Publication Data

US 2014/0112117 A1    Apr. 24, 2014

(30) Foreign Application Priority Data

Oct. 23, 2012    (JP) ................. 2012-233789

(51) Int. Cl.
- *G11B 7/12*    (2012.01)
- *G11B 20/00*    (2006.01)
- *G11B 7/1263*    (2012.01)
- *G11B 7/005*    (2006.01)

(52) U.S. Cl.
CPC .............. *G11B 7/1263* (2013.01); *G11B 7/005* (2013.01)

(58) Field of Classification Search
CPC ...... G11B 7/1263; G11B 7/127; G11B 7/126; G11B 7/1267; G11B 7/12; G11B 7/125; G11B 7/005; G11B 2007/0013; G11B 11/10584; G11B 11/10595; G11B 19/041; G11B 2007/0006; G11B 2020/1298; G11B 20/1217; G11B 7/0037; G11B 7/0045

USPC .............. 369/47.5, 116, 47.52, 44.27, 59.11
See application file for complete search history.

(56) References Cited

U.S. PATENT DOCUMENTS

| 8,111,599 B2 * | 2/2012 | Furumiya ................. 369/47.49 |
| 2005/0128913 A1 * | 6/2005 | Yun ............................ 369/53.26 |
| 2007/0008836 A1 * | 1/2007 | Imagawa et al. ........... 369/44.23 |
| 2010/0232271 A1 * | 9/2010 | Muto et al. ................. 369/47.19 |
| 2011/0161994 A1 * | 6/2011 | Minamiguchi et al. ....... 720/659 |

FOREIGN PATENT DOCUMENTS

| JP | 2003085804 A | * | 3/2003 | ............. G11B 7/125 |
| WO | 2004-105006 A1 | | 12/2004 | |

* cited by examiner

*Primary Examiner* — Dionne Pendleton
(74) *Attorney, Agent, or Firm* — Global IP Counselors, LLP

(57) ABSTRACT

An optical disc device is configured to reproduce an optical disc. The optical disc device includes an optical pickup, a high-frequency production component, a driver and a controller. The optical pickup includes a laser emission component configured to emit a laser beam, and a light receiver configured to receive returning light of the laser beam. The high-frequency production component is configured to produce a high-frequency signal. The driver is configured to produces a drive signal for driving the laser emission component by superposing the high-frequency signal produced by the high-frequency production component onto a specific drive signal. The controller is configured to control the high-frequency production component to adjust an amplitude of the high-frequency signal.

20 Claims, 4 Drawing Sheets

OPTICAL DISC DEVICE AND OPTICAL DISC REPRODUCTION METHOD

CROSS-REFERENCE TO RELATED APPLICATIONS

This application claims priority to Japanese Patent Application No. 2012-233789 filed on Oct. 23, 2012. The entire disclosure of Japanese Patent Application No. 2012-233789 is hereby incorporated herein by reference.

BACKGROUND

1. Field of the Invention

The present invention generally relates to an optical disc device. More specifically, the present invention relates to an optical disc device for reproducing an optical disc, and to an optical disc reproduction method.

2. Background Information

Optical discs such as CDs (compact discs), DVDs (digital versatile discs), and BDs (Blu-ray Discs™) have come into widespread use in recent years. Furthermore, optical disc devices have been developed as devices that read, record, and reproduce the information recorded on an optical disc, such as audio information or image information. Examples of well known optical disc devices include CD players, DVD players, BD recorders, and CD-ROM drives that are connected to a personal computer.

An optical disc device is equipped with an optical pickup for reading information by directing a laser beam at an optical disc. The optical pickup has a laser diode for directing the laser beam at the information recording face of the optical disc, which is fixed to and rotating on a turntable.

The optical pickup also has a photodetector, such as a photodiode, for receiving reflected light from the information recording face. The optical pickup converts light into an electrical signal by means of this photodetector, and outputs the resulting signal.

In order to read information accurately from an optical disc, tracking must be performed, in which the optical axis of the laser beam is made to track the center of pits formed on the optical disc. To do this, an actuator for driving an object lens in the radial direction of the optical disc, and a tracking servo for controlling the actuator are provided inside the optical pickup device.

To improve the quality of the signal from the optical pickup and to enhance servo performance in an optical disc device such as this, a technique has been employed in which a high-frequency signal is superposed over the drive signal of the laser diode that emits the laser beam.

In relation to this technique, an optical disc device has been disclosed and proposed in which disturbance of the signal from the optical pickup is detected, and the amplitude of the high-frequency signal superposed onto the drive signal (hereinafter referred to as the "high-frequency superposition amplitude") is varied according to this detection result (see International Publication No. WO 2004/105006 (Patent Literature 1), for example).

SUMMARY

However, it has been discovered that with the above-mentioned technology, if the amount of change when changing the high-frequency superposition amplitude is relatively large, then the laser power will fluctuate dramatically, and the signal level from the optical pickup will end up fluctuating greatly. As a result, servo disturbance and other such problems occur and stable reproduction is difficult.

One object of the present disclosure is to provide an optical disc device and an optical disc reproduction method with which an optical disc is reproduced while stable reproduction is performed even when high-frequency superposition amplitude is greatly changed.

In view of the state of the know technology, an optical disc device is configured to reproduce an optical disc. The optical disc device includes an optical pickup, a high-frequency production component, a driver and a controller. The optical pickup includes a laser emission component configured to emit a laser beam, and a light receiver configured to receive returning light of the laser beam. The high-frequency production component is configured to produce a high-frequency signal. The driver is configured to produces a drive signal for driving the laser emission component by superposing the high-frequency signal produced by the high-frequency production component onto a specific drive signal. The controller is configured to control the high-frequency production component to adjust an amplitude of the high-frequency signal.

Other objects, features, aspects and advantages of the present disclosure will become apparent to those skilled in the art from the following detailed description, which, taken in conjunction with the annexed drawings, discloses a preferred embodiment of the optical disc device and the optical disc reproduction method.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
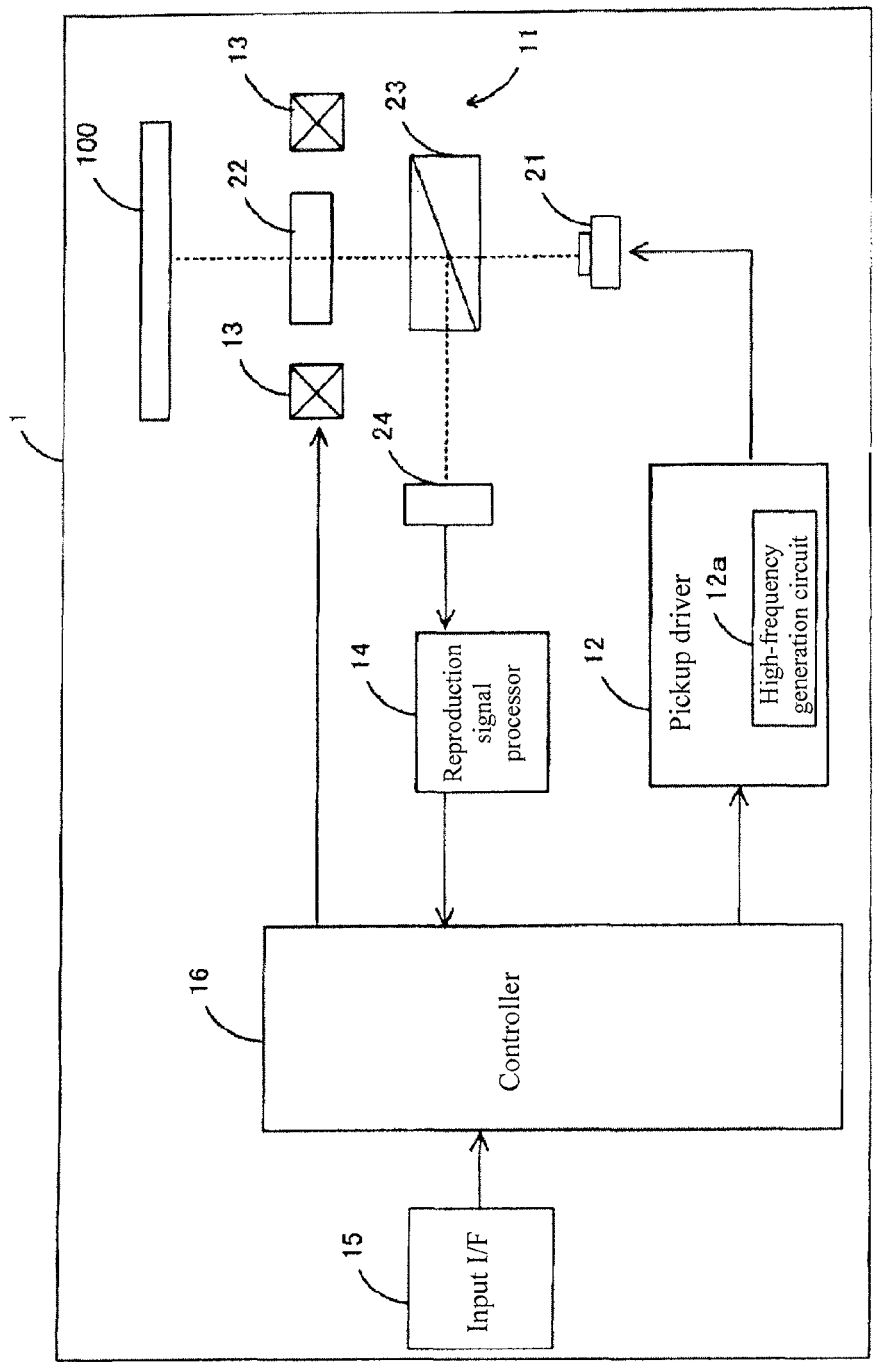
FIG. 1 is a block diagram of an overall configuration of an optical disc device in accordance with one embodiment.

Referring initially to FIG. 1, a device configuration of an optical disc device 1 is illustrated in accordance with one embodiment. The optical disc device 1 records data in a television broadcast to a CD, a DVD, a BD or other such optical disc 100. The optical disc device 1 also reproduces data recorded to the optical disc 100, and outputs the data to an external device, such as a liquid crystal monitor, a display device, and the like (not shown) electrically connected to the optical disc device 1.

As shown in FIG. 1, the optical disc device 1 includes an optical pickup 11, a pickup driver 12 (an example of a driver), a position controller 13, a reproduction signal processor 14, an input interface 15, and a controller 16.

The optical pickup 11 includes a semiconductor laser 21 (an example of a laser emission component) that emits a laser beam, an object lens 22 serving as an optical system that forms the optical path of the laser beam, a polarizing beam splitter 23, and a light receiver 24. Basically, a conventional optical pickup can be used as the optical pickup 11. Thus, detailed description will be omitted for the sake of brevity.

The semiconductor laser 21 oscillates at a specific period according to the drive signal inputted from the pickup driver 12, and emits a laser beam. The semiconductor laser 21 includes a laser diode that emits a laser beam corresponding to a type of the optical disc 100, such as a laser beam in the 650 nm band corresponding to a DVD, a laser beam in the 780 nm band corresponding to a CD, for example. In the illustrated embodiment, the semiconductor laser 21 is given as an example of a device that emits a laser. However, the laser beam can instead be emitted by some other device.

The object lens 22 and the polarizing beam splitter 23 guide the laser beam emitted from the semiconductor laser 21 to the optical disc 100, and also guide the return light formed when the laser beam is reflected by the optical disc 100, to the light receiver 24.

The light receiver 24 includes a light receiving element such as a photodiode. The light receiver 24 converts the received light into an electrical signal, and outputs this signal. The light receiver 24 includes a light receiving region. The light receiving region is divided into four parts, for example, performs opto-electric conversion individually in each region, and outputs the resulting electrical signals. This allows a reproduction signal RF or various kinds of control signal to be outputted.

The pickup driver 12 produces a drive signal for driving the semiconductor laser 21. This drive signal is produced by high-frequency superposition. The goal of high-frequency superposition is to reduce noise in return light, and a drive signal is produced by superposing a high-frequency signal over the original or base drive signal.

Therefore, the pickup driver 12 is equipped with a high-frequency generation circuit 12a (an example of a high-frequency production component) that produces high-frequency signals. The high-frequency generation circuit 12a produces high-frequency signals of a specific amplitude according to control signals inputted from the controller 16.

The position controller 13 controls the position of the object lens 22 based on a tracking error signal TE or focus error signal FE inputted from the controller 16. The position controller 13 is equipped with a biaxial actuator that varies the position of the object lens 22.

The position controller 13 performs tracking control, in which the object lens 22 is made to follow the track of the optical disc, based on the tracking error signal TE. The position controller 13 also performs focus control, in which the focal distance of the object lens 22 is adjusted, based on the focus error signal FE. A conventional position controller can be used as the position controller 13. Thus, detailed description will be omitted for the sake of brevity.

The reproduction signal processor 14 demodulates the reproduction signal RF and control signal inputted from the optical pickup 11. The reproduction signal processor 14 subjects the demodulated reproduction signal RF to error correction processing.

The input interface 15 includes a tuner that acquires television broadcast signals, for example. The data acquired by the input interface 15 is converted into data that is written to the optical disc 100 by the optical pickup 11. Of course, the input interface 15 can include any types of input interfaces or connector to obtain the television broadcast signal via an antenna, a cable, and the like. Also, the input interface can be connected to an external device that provides data to be recorded to the optical disc 100.

The controller 16 is a computation processing device that performs overall control of the drive of the optical disc device 1. A DSP (Digital Signal Processor) is an example of this. The controller 16 produces a tracking error signal TE, a focus error signal FE, or the like based on the control signal demodulated by the reproduction signal processor 14, and outputs this signal to the position controller 13. The controller 16 also has the function of instructing the high-frequency generation circuit 12a to change the high-frequency superposition amplitude.

Figure 2:
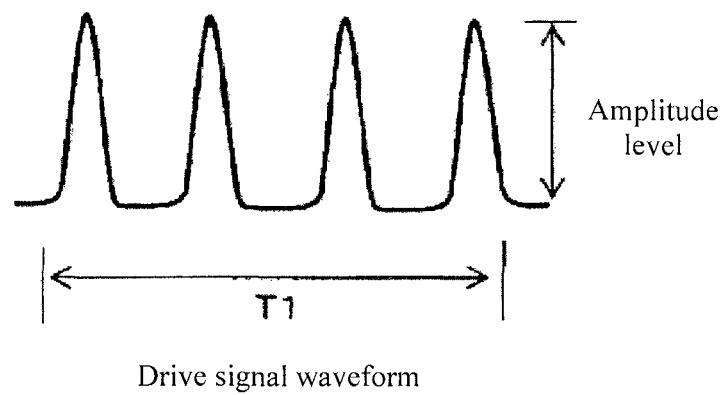
FIG. 2 is a schematic diagram of a waveform illustrating a drive signal waveform of a laser diode of the optical disc device.

Next, the waveforms of the various signals in the illustrated embodiment will be described. FIG. 2 is a schematic diagram of a waveform illustrating the drive signal waveform of the semiconductor laser 21. The output level of the laser beam, which affects reproduction quality, can be found from the average value for the amplitude level of the drive signal in a certain time period T1.

Also, with high-frequency superposition, the output level of the drive signal can be varied by varying the high-frequency superposition amplitude. The controller 16 sets the high-frequency superposition amplitude by outputting a specific control signal to the high-frequency generation circuit 12a. Upon receiving this control signal, the high-frequency generation circuit 12a starts producing a high-frequency signal according to the designated high-frequency superposition amplitude.

The controller 16 changes the high-frequency superposition amplitude according to the operating mode of the optical disc device 1, for example. More specifically, the high-frequency superposition amplitude is changed between a test recording mode in which a test recording is made on the optical disc 100, and a reproduction mode, in which the optical disc 100 is reproduced. The test recording mode is different mode from the reproduction mode.

When the high-frequency superposition amplitude is changed by the method disclosed in Patent Literature 1, for example, in the test recording mode, a high-frequency superposition amplitude is used that is from 2.4 to 3.8 times the high-frequency superposition amplitude that is used in the reproduction mode.

When the test recording mode is switched to the reproduction mode, the controller 16 changes the high-frequency signal to the amplitude level used in the reproduction mode. This allows the setting of the output level of the laser beam and the control of the object lens in the reproduction mode to be performed more optimally, and raises the reproduction quality.

Nevertheless, when the high-frequency superposition amplitude is changed in response to the mode switching as mentioned above, the amount of change is relatively large. Thus, the laser power of the semiconductor laser 21 can fluctuate sharply. As a result, there is the possibility that the signal level of the tracking error signal TE or reproduction signal RF will fluctuate greatly, leading to servo disturbance or other such problems.

Figure 5:
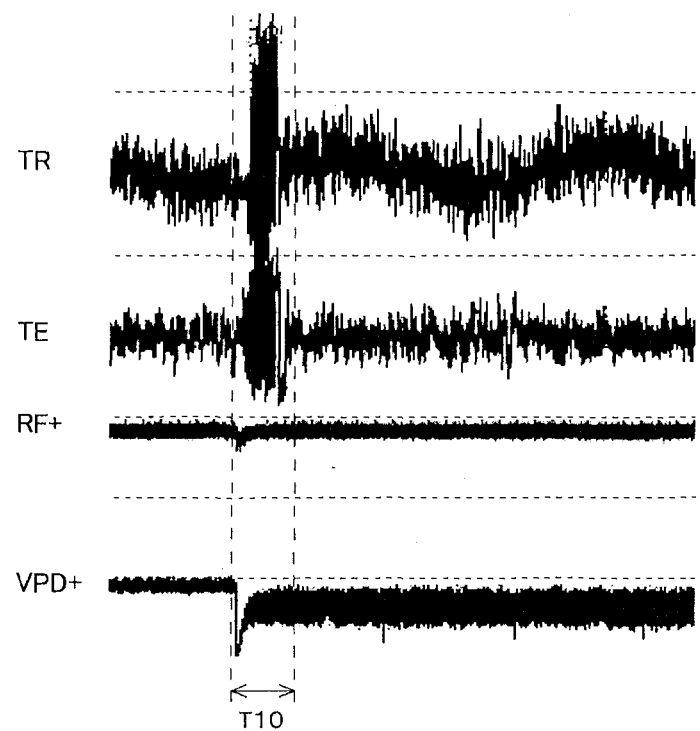
FIG. 5 is a waveform diagram illustrating waveforms during conventional amplitude change processing.

FIG. 5 is a waveform diagram illustrating waveforms of various signals when the high-frequency superposition amplitude is changed by a large amount with a conventional optical disc device. As shown in FIG. 5, the first level (or row) illustrates a tracking drive signal TR, the second level illustrates the tracking error signal TE, the third level illustrates a reproduction signal RF+, and the fourth level illustrates an output signal VPD+ from a front light monitor attached to the semiconductor laser 21 (hereinafter referred to as the "output signal VPD+").

At the time period T10 shown in FIG. 5, a large disturbance occurs in the tracking drive signal TR and the tracking error signal TE. This is because the high-frequency superposition amplitude changed greatly, and the output signal VPD+ changed suddenly. As a result, tracking servo disturbance occurs.

On the other hand, with the optical disc device 1 in accordance with one embodiment, to avoid the tracking servo disturbance and other such problems discussed above, the configuration is such that when the high-frequency superposition amplitude is changed greatly, the high-frequency superposition amplitude is changed in stages or stepwisely. The amplitude change processing in the illustrated embodiment will now be described in detail.

Figure 3:
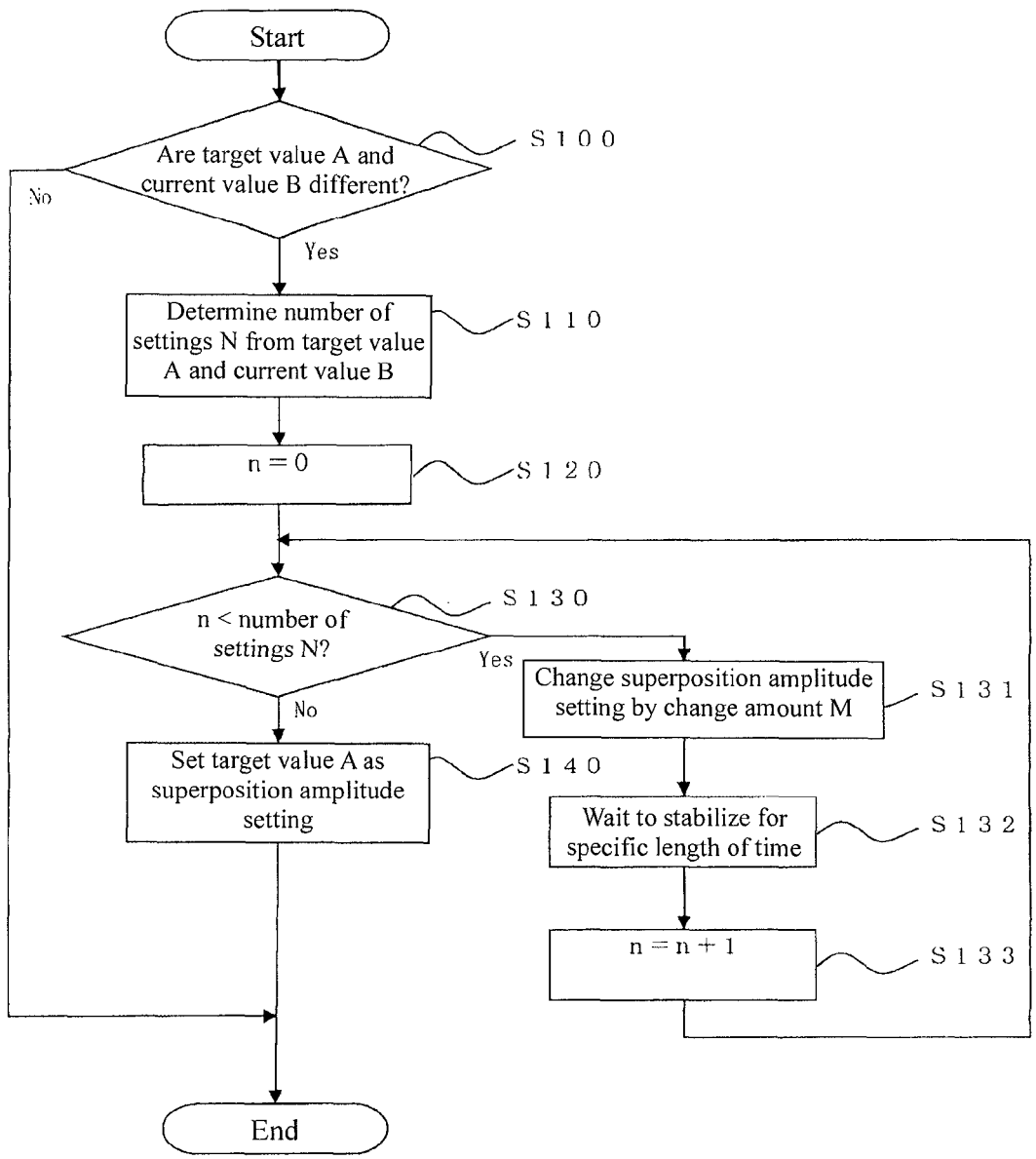
FIG. 3 is a flowchart of amplitude change processing of the optical disc device in accordance with one embodiment.

The amplitude change processing performed on the high-frequency superposition amplitude in the illustrated will be described through reference to the flowchart in FIG. 3. The processing flow shown in FIG. 3 is performed when there is a difference (i.e., amount of change in amplitude or amplitude change amount of the high-frequency signal) between the target value of the high-frequency superposition amplitude (hereinafter referred to as "target value A") and the current high-frequency superposition amplitude that is detected (hereinafter referred to as "current value B").

When there is a change in the high-frequency superposition amplitude such as that in Patent Literature 1, such as when the high-frequency superposition amplitude is changed between the test recording mode and the reproduction mode, if the reproduction mode is switched to the test recording mode, then the target value A becomes the value of the high-frequency superposition amplitude used during the test recording mode. The controller 16 constantly monitors the difference between the target value A and the current value B. In other words, in the illustrated embodiment, the operating mode of the operating mode of the optical disc device 1 includes at least the test recording mode and the reproduction mode (e.g., the data reproduction mode). The controller 16 determines the target value A according to the operating mode of the optical disc device 1. Specifically, in the illustrated embodiment, the operating mode of the optical disc device 1 includes a plurality of different operating modes, such as the test recording mode and the reproduction mode. Then, the controller 16 determines different target values according to the different operating modes, respectively.

After this processing has begun, in step S100, the controller 16 determines whether or not the target value A and the current value B are different. If the target value A and the current value B are not different, this processing is ended. However, monitoring of the target value A and the current value B continues. Of course, the controller 16 can determine that the target value A and current value B are different only when the difference between the target value A and the current value B is larger than a predetermined threshold. In other words, the controller 16 can determine that the target value A and current value B are not different when the difference between the target value A and the current value B is smaller than the predetermined threshold, which is not zero.

If the target value A and the current value B are different, in step S110, the controller 16 calculates the number of times the amplitude change processing will be performed (hereinafter referred to as the "number of settings N") from the target value A and the current value B. More specifically, the difference between the target value A and the current value B is divided by a specified change amount (e.g., a predetermined change amount) (hereinafter referred to as the "change amount M"), which is an upper limit of the amount of change in a single instance of the amplitude change processing. Consequently, the number of settings N is calculated. That is, the following equation is obtained: the number of settings N=(the target value A−the current value B)÷the change amount M. Here, the number of settings N is a natural number. Thus, in the illustrated embodiment, the controller 16 calculates the different between the target value A and the current value B as the amplitude change amount of the high-frequency signal based on the target value A of the amplitude of the high-frequency signal in response to the operating mode of the optical disc device 1 being changed. Then, the controller calculates the number of settings N based on the amplitude change amount of the high-frequency signal and the change amount M of each amplitude adjustment of the high-frequency signal. More specifically, the controller 16 is further configured to calculate the number of settings N by dividing the amplitude change amount of the high-frequency signal by the change amount M.

The value of the change amount M, which is the specified change amount, has been predetermined by testing during the setting of the optical disc device 1, etc. More specifically, the change amount M is preset so that the percentage fluctuation in the output signal VPD+ caused by a single instance of amplitude change processing will be less than 10%, for example.

Next, in step S120, the controller 16 plugs zero in as a variable n (n is a natural number including zero). Then, in step S130, the controller 16 determines whether or not the value of the variable n is under the number of settings N.

If the variable n is under the number of settings N, then, in step S131, the controller 16 sends a control signal to the high-frequency generation circuit 12a so that the high-frequency superposition amplitude will be changed by the change amount M. Then, in step S132, the controller 16 waits for a specific waiting time or waiting period in order to stabilize the output signal VPD+. More specifically, the waiting time is about 1 ms, for example. In the illustrated embodiment, the controller 16 waits for the waiting time of a predetermined length in each of the stages in response to the amplitude of the high-frequency signal being adjusted.

Then, in step S133, the controller 16 increments the variable n by 1, after which the flow goes back to step S130.

To return the description to step S130, if the variable n is not under the number of settings N, then, in step S140, the controller 16 sets the high-frequency superposition amplitude to the target value A. The final setting is thus performed. That is, in just the final setting is the target value A itself set, rather than changing the high-frequency superposition amplitude by the change amount M. In the illustrated embodiment, the controller 16 controls the high-frequency generation circuit 12a such that the amplitude of the high-frequency signal is adjusted based on the change amount M and the number of settings N. Specifically, in the illustrated embodiment, the controller 16 controls the high-frequency generation circuit 12a such that the amplitude of the high-frequency signal is adjusted for a number of times corresponding to the number of settings N by the change amount M. Then, the controller 16 controls the high-frequency generation circuit 12a such that the amplitude of the high-frequency signal is adjusted to the target value A after the amplitude of the high-frequency signal is repeatedly adjusted for the number of times corresponding to the number of settings N by the change amount M.

Figure 4:
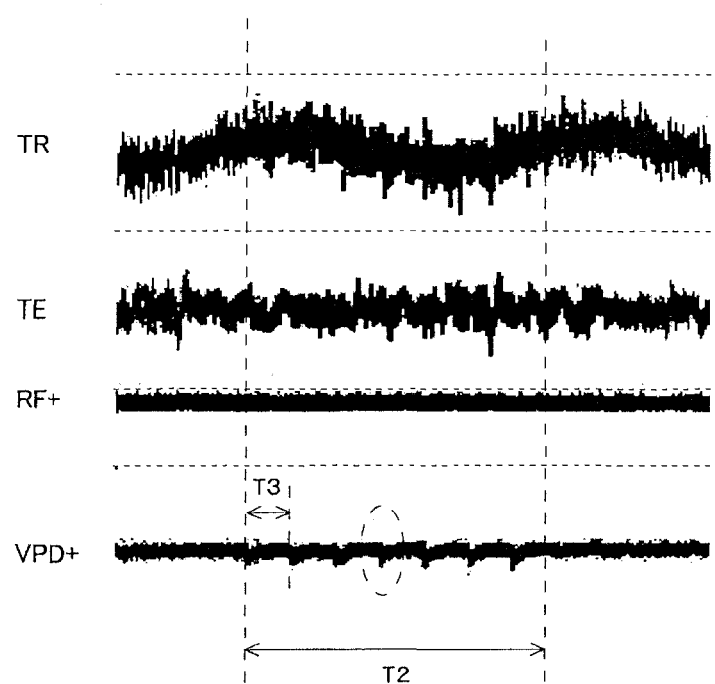
FIG. 4 is a waveform diagram illustrating waveforms during the amplitude change processing.

FIG. 4 is a waveform diagram illustrating waveforms of various signals when the above-mentioned amplitude change processing is performed. FIG. 4 is the same as FIG. 5 in that the first level (or row) illustrates the tracking drive signal TR, the second level illustrates the tracking error signal TE, the third level illustrates the reproduction signal RF+, and the fourth level illustrates the output signal VPD+.

The time period T2 shown in FIG. 4 is the one in which the amplitude change is performed a plurality of times by the loop from step S130 to step S133. The portion indicated by the broken-line oval in the output signal VPD+ in FIG. 4 illustrates the power fluctuation caused by a single amplitude change.

FIG. 4 shows an example in which amplitude change is performed seven times, and therefore the power also fluctuates seven times during the time period T2. Accordingly, the power fluctuation each time is less than the power fluctuation shown in the time period T10 in FIG. 5.

Also, a time period T3, which corresponds to the waiting time, is provided every time the amplitude is changed, to stabilize the output signal VPD+. As a result, no major disturbance occurs in the tracking drive signal TR or the tracking error signal TE. Nor does any disturbance occur in the reproduction signal RF+.

With the illustrated embodiment, the target value A and the current value B of the high-frequency superposition amplitude are compared. If there is a difference between the two values, then the high-frequency superposition amplitude is gradually changed in stages so that the fluctuation in the output signal VPD+ is within a specific range. Also, the waiting time for stabilizing the output signal VPD+ is provided for every change. Consequently, even though the high-frequency superposition amplitude is changed greatly in total, no servo disturbance or other such problems are encountered, and reproduction can be carried out stably.

The present invention was described above by giving a preferred embodiment, but the present invention is not necessarily limited to the above embodiment and examples, and various modifications are possible within the technological concept thereof.

Therefore, the present invention can also be applied to the following embodiments.

(A) In the illustrated embodiment, the various functions related to the amplitude change processing are realized by executing a program in a microprocessor or other such computation processing device. However, these functions can instead be realized by a plurality of circuits. Also, the controller 16 can include a microprocessor or microcomputer with the amplitude change processing program that controls the pickup driver 12 as mentioned above. The controller 16 can also include other conventional components such as an input interface circuit, an output interface circuit, and storage devices such as a ROM (Read Only Memory) device and a RAM (Random Access Memory) device. The microcomputer of the controller 16 can be programmed to control the pickup driver 12. The memory circuit stores processing results and control programs that are run by the microcomputer. The internal RAM of the controller 16 stores statuses of operational flags and various control data. The internal ROM of the controller 16 stores the programs for various operations. The controller 16 is also capable of selectively controlling any of the components of the optical disc device 1 in accordance with the control program. It will be apparent to those skilled in the art from this disclosure that the precise structure and algorithms for the controller 16 can be any combination of hardware and software that will carry out the functions of the present invention.

(B) In the illustrated embodiment, switching from the test recording mode to the reproduction mode is given as an example of processing in which the high-frequency superposition amplitude is changed greatly. However, the present invention can also be applied to switching from the reproduction mode to the test recording mode. Also, raising the high-frequency superposition amplitude in the test recording mode is just an example, and the amplitude of the high-frequency signal can be lowered instead.

(C) The device to which the present invention is applied need not have the configuration given in the embodiment, and can instead be, for example, a display device, a personal computer, a portable terminal device, a car navigation device, or the like that is equipped with an optical disc device.

The optical disc device of the present disclosure is an optical disc device for reproducing an optical disc. The optical disc device includes an optical pickup, a high-frequency production component, a driver, and a controller. The optical pickup includes a laser emission component that emits a laser beam, and a light receiver that receives returning light of the laser beam. The high-frequency production component produces a high-frequency signal. The driver produces a drive signal for driving the laser emission component by superposing the high-frequency signal produced by the high-frequency production component onto a specific drive signal. The controller controls the high-frequency production component so as to adjust the amplitude of the superposed high-frequency signal.

With this configuration, the drive signal for driving the laser emission component is produced by superposing the high-frequency signal produced by the high-frequency production component over the specific drive signal. Also, the controller controls the high-frequency production component so as to adjust the amplitude of this high-frequency signal. Consequently, stable reproduction will be possible even if the amplitude needs to be adjusted due to environmental changes, changes in the device state, or the like.

Also, the optical disc device of the present disclosure can be configured such that the controller controls the high-frequency production component so as to vary the amplitude of the superposed high-frequency signal in stages.

With this configuration, the amplitude changes are not made all at once, and instead the amplitude is changed gradually over a number of times. This increases or decreases the drive signal of the laser emission component in stages. Therefore, there are fewer problems such as servo disturbance caused by a sudden increase or decrease in the drive signal, which leads to a sudden increase or decrease in the laser power.

Also, the optical disc device of the present disclosure can be configured such that the controller controls the high-frequency production component so as to vary the amplitude of the superposed high-frequency signal according to the operating mode of the optical disc device.

With this configuration, reproduction can be performed stably even when the amplitude needs to be adjusted because the operating mode has changed.

Also, the optical disc device of the present application can be configured such that the controller controls the high-frequency production component so as to calculate a number of settings by dividing the amount of change in amplitude in the amplitude adjustment of the superposed high-frequency signal by a specified change amount established ahead of time, and to adjust the amplitude based on the specified change amount and the number of settings.

With this configuration, the amplitude is changed by the specified change amount for the calculated number of settings, which allows the drive signal of the laser emission component to be increased or decreased in stages.

Also, the optical disc device of the present disclosure can be configured such that the controller controls the high-frequency production component so as to change the amplitude to a specific target value after the adjustment has been carried out based on the specified change amount and the number of settings.

With this configuration, after the amplitude has been changed for the calculated number of settings, the final change processing is done to change the amplitude to the specific target value, such as the target value suited to the operating mode. Therefore, the amplitude can be changed to the target value without error.

Also, the optical disc device of the present disclosure can be configured such that when the controller varies the amplitude of the superposed high-frequency signal in stages, the controller provides a waiting time of a predetermined length for every stage of change.

With this configuration, the next change processing is carried out only after the laser power of the laser emission component has been stabilized in the waiting time.

Also, the optical disc reproduction method of the present disclosure includes an emission step of emitting a laser beam at the optical disc with a laser emission component, a light reception step of receiving returning light of the laser beam, a production step of producing a high-frequency signal, a drive step of producing a drive signal for driving the laser emission component by superposing the high-frequency signal produced in the production step onto a specific drive signal, and an adjustment step of adjusting the amplitude of the superposed high-frequency signal.

With this configuration, in the optical disc reproduction method in which the optical disc device reproduces the optical disc, reproduction can be performed stably even if the amplitude needs to be adjusted due to environmental changes, changes in the device state, or the like.

Accordingly, with the optical disc device and the optical disc reproduction method, stable reproduction becomes possible, without causing any problems such as servo disturbance, even when the high-frequency superposition amplitude is greatly changed in total.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. An optical disc device configured to reproduce an optical disc, the optical disc device comprising:
    an optical pickup including a laser emission component configured to emit a laser beam, and a light receiver configured to receive returning light of the laser beam;
    a high-frequency production component configured to produce a high-frequency signal;
    a driver configured to produces a drive signal for driving the laser emission component by superposing the high-frequency signal produced by the high-frequency production component onto a specific drive signal; and
    a controller configured to control the high-frequency production component to adjust an amplitude of the high-frequency signal,
    the controller being further configured to calculate a number of settings based on an amplitude change amount of the high-frequency signal and a predetermined change amount of each amplitude adjustment of the high-frequency signal, the controller being further configured to control the high-frequency production component such that the amplitude of the high-frequency signal is adjusted based on the predetermined change amount and the number of settings.

2. The optical disc device according to claim 1, wherein the controller is further configured to control the high-frequency production component such that the amplitude of the high-frequency signal increases or decreases in stages to a specific target value of the amplitude of the high-frequency signal.

3. The optical disc device according to claim 2, wherein
    the controller is further configured to control the high-frequency production component such that the amplitude of the high-frequency signal increases in stages according to an operating mode of the optical disc device.

4. The optical disc device according to claim 2, wherein
    the controller is further configured to control the high-frequency production component such that the amplitude of the high-frequency signal decreases in stages according to an operating mode of the optical disc device.

5. The optical disc device according to claim 2, wherein
    the controller is further configured to wait for a waiting time of a predetermined length in each of the stages in response to the amplitude of the high-frequency signal being adjusted.

6. The optical disc device according to claim 2, wherein
    the controller is further configured to control the high-frequency production component such that the amplitude of the high-frequency signal varies according to operating modes of the optical disc device.

7. The optical disc device according to claim 2, wherein
    the controller is further configured to control the high-frequency production component such that the amplitude of the high-frequency signal varies according to an operating mode of the optical disc device.

8. The optical disc device according to claim 7, wherein
    the operating mode of the optical disc device includes at least a test recording mode and a data reproduction mode.

9. The optical disc device according to claim 7, wherein
    the controller is further configured to determine the target value of the amplitude of the high-frequency signal according to the operating mode of the optical disc device.

10. The optical disc device according to claim 9, wherein
    the operating mode of the optical disc device includes a plurality of different operating modes,
    the controller being further configured to determine different target values of the amplitude of the high-frequency signal according to the different operating modes, respectively.

11. The optical disc device according to claim 1, wherein
    the controller is further configured to calculate the number of settings by dividing the amplitude change amount of the high-frequency signal by the predetermined change amount, and the controller is further configured to control the high-frequency production component such that the amplitude of the high-frequency signal is adjusted for a number of times corresponding to the number of settings by the predetermined change amount.

12. The optical disc device according to claim 11, wherein the controller is further configured to control the high-frequency production component such that the amplitude of the high-frequency signal is adjusted to a specific target value after the amplitude of the high-frequency signal is adjusted for the number of times corresponding to the number of settings by the predetermined change amount.

13. The optical disc device according to claim 1, wherein the controller is further configured to control the high-frequency production component such that the amplitude of the high-frequency signal varies in stages, and
the controller is further configured to control the high-frequency production component such that the amplitude of the high-frequency signal varies according to operating modes of the optical disc device.

14. The optical disc device according to claim 13, wherein the controller is further configured to calculate the number of settings by dividing the amplitude change amount of the high-frequency signal by the predetermined change amount, and
the controller is further configured to control the high-frequency production component such that the amplitude of the high-frequency signal is adjusted for a number of times corresponding to the number of settings by the predetermined change amount.

15. The optical disc device according to claim 13, wherein the controller is further configured to control the high-frequency production component such that the amplitude of the high-frequency signal is adjusted to a specific target value after the amplitude of the high-frequency signal is adjusted for the number of times corresponding to the number of settings by the predetermined change amount.

16. The optical disc device according to claim 1, wherein the controller is further configured to control the high-frequency production component such that the amplitude of the high-frequency signal varies according to an operating mode of the optical disc device,
the controller is further configured to determine a target value of the amplitude of the high-frequency signal according to the operating mode of the optical disc device, and the controller is further configured to calculate the amplitude change amount of the high-frequency signal based on the target value of the amplitude of the high-frequency signal in response to the operating mode of the optical disc device being changed.

17. The optical disc device according to claim 16, wherein the controller is further configured to calculate the number of settings by dividing the amplitude change amount of the high-frequency signal by the predetermined change amount, and
the controller is further configured to control the high-frequency production component such that the amplitude of the high-frequency signal is adjusted for a number of times corresponding to the number of settings by the predetermined change amount.

18. The optical disc device according to claim 17, wherein the controller is further configured to control the high-frequency production component such that the amplitude of the high-frequency signal is adjusted to the target value of the amplitude of the high-frequency signal after the amplitude of the high-frequency signal is repeatedly adjusted for the number of times corresponding to the number of settings by the predetermined change amount.

19. The optical disc device according to claim 1, wherein the predetermined change amount of each of amplitude adjustment of the high-frequency signal is set to a value that is larger than zero and smaller than the amplitude change amount of the high-frequency signal.

20. An optical disc reproduction method configured to reproduce an optical disc, the method comprising:
emitting a laser beam to the optical disc with a laser emission component;
receiving returning light of the laser beam;
producing a high-frequency signal;
producing a drive signal for driving the laser emission component by superposing the high-frequency signal onto a specific drive signal;
adjusting an amplitude of the high-frequency signal;
calculating a number of settings based on an amplitude change amount of the high-frequency signal and a predetermined change amount of each amplitude adjustment of the high-frequency signal; and
adjusting the amplitude of the high-frequency signal based on the predetermined change amount and the number of settings.

* * * * *